United States Patent
Keene (10) Patent No.: US 6,353,440 B1
(45) Date of Patent: Mar. 5, 2002

(54) HARDWARE ASSIST FOR YUV DATA FORMAT CONVERSION TO SOFTWARE MPEG DECODER

(75) Inventor: David Keene, San Mateo, CA (US)

(73) Assignee: S3 Graphics Co., Ltd., Cayman Islands (KN)

(*) Notice: Subject to any disclaimer, the term of this patent is extended or adjusted under 35 U.S.C. 154(b) by 0 days.

(21) Appl. No.: 09/430,370

(22) Filed: Oct. 29, 1999

Related U.S. Application Data (63) Continuation of application No. 08/619,203, filed on Mar. 21, 1996, now Pat. No. 6,005,546.

(51) Int. Cl.[7] .................................................. G09G 5/04
(52) U.S. Cl. .................... 345/603; 345/531; 345/520; 345/547; 345/562
(58) Field of Search ................................. 345/154, 186, 345/501, 523–525, 155, 434, 203, 530–535, 547, 545, 572, 603–604, 520, 562; 348/453, 717, 384

(56) References Cited

U.S. PATENT DOCUMENTS

| | | | |
|---|---|---|---|
| 5,136,379 A | 8/1992 | Ishii | 358/138 |
| 5,341,175 A | 8/1994 | Koz | 348/552 |
| 5,428,389 A | 6/1995 | Ito et al. | 348/231 |
| 5,446,860 A | 8/1995 | Dresser et al. | 395/427 |
| 5,450,130 A | 9/1995 | Foley | 348/391 |
| 5,459,516 A | 10/1995 | Song | 348/402 |
| 5,461,420 A | 10/1995 | Yonemitsu et al. | 348/401 |
| 5,469,228 A | 11/1995 | Kim et al. | 348/715 |
| 5,488,432 A | 1/1996 | Guillon et al. | 348/717 |
| 5,489,942 A | 2/1996 | Kawahara | 348/401 |
| 5,495,291 A | 2/1996 | Adams | 348/390 |
| 5,500,577 A | 3/1996 | Kim et al. | 315/364 |
| 5,502,503 A | 3/1996 | Koz | 348/552 |
| 5,526,025 A | 6/1996 | Selwan et al. | 345/200 |
| 5,553,220 A | 9/1996 | Keene | 395/154 |
| 5,604,514 A | 2/1997 | Hancock | 345/154 |
| 5,611,041 A | 3/1997 | Bril et al. | 395/507 |
| 5,642,139 A | 6/1997 | Eglit et al. | 345/202 |
| 5,654,773 A | 8/1997 | Kajimoto et al. | 348/717 |
| 5,666,137 A | 9/1997 | Coelho et al. | 345/155 |
| 5,699,277 A | 12/1997 | Munson et al. | 364/514 |
| 5,815,168 A | * 9/1998 | May | 345/516 |
| 5,874,995 A | * 2/1999 | Naimpally et al. | 348/384 |
| 6,005,546 A | * 12/1999 | Keene | 345/154 |
| 6,067,098 A | * 5/2000 | Dye | 345/531 |
| 6,107,987 A | * 8/2000 | Coelho | 345/154 |

FOREIGN PATENT DOCUMENTS

| | | | |
|---|---|---|---|
| EP | 797181 A2 | 9/1997 | G09G/1/16 |
| EP | 797181 A3 | 1/1998 | |

OTHER PUBLICATIONS

Undy S. et al. "A Low–Cost Graphics and Multimedia Workstation Chip Set", vol. 14, No. 2, pp. 10–22, IEEE Micro, Apr. 1994.

Lee, Ruby B. et al., "Real–Time Software MPEG Video Decoder on Multimedia–Enhanced PA 7100LC Processors", vol. 46, No. 2, pp. 60–68, Hewlett–Packard Journal, Apr. 1995.

* cited by examiner

Primary Examiner—Richard Hjerpe
Assistant Examiner—Francis Nguyen
(74) Attorney, Agent, or Firm—Carr & Ferrell LLP (57) ABSTRACT

A display controller assists a host processor in decoding MPEG data. The display controller receives YUV data in non-pixel video format from a host CPU and perform the otherwise CPU intensive task of rasterization within the display controller. In addition, the display controller may use its internal BITBLIT engine to copy U and V data from one line in a BITBLIT operation to adjacent lines, so as to replicate U and V data. A byte mask preserves Y data on the adjacent lines from being overwritten. At the end of the BITBLIT operation, the display controller generates a signal indicating that the frame buffer has been filled with new data, and thus display controller automatically switches to reading from the newly written frame buffer.

27 Claims, 8 Drawing Sheets

| | | | | | |
|---|---|---|---|---|---|
| LINE 1 | Y | U | Y | V | Y |
| LINE 2 | Y | * | Y | * | X |
| LINE 3 | Y | U | Y | V | Y |

| LINE 3 | S + 2P + 3 | $Y_{3,7}$ | $Y_{3,8}$ | $V_{2,4}$ | $U_{2,4}$ |
| --- | --- | --- | --- | --- | --- |
| | S + 2P + 2 | $Y_{3,5}$ | $Y_{3,6}$ | $V_{2,3}$ | $U_{2,3}$ |
| | S + 2P + 1 | $Y_{3,3}$ | $Y_{3,4}$ | $V_{2,2}$ | $U_{2,2}$ |
| | S + 2P + 0 | $Y_{3,1}$ | $Y_{3,2}$ | $V_{2,1}$ | $U_{2,1}$ |

⋮

| LINE 2 | S + P + 3 | $Y_{2,7}$ | $Y_{2,8}$ | $V_{1,4}$ | $U_{1,4}$ |
| --- | --- | --- | --- | --- | --- |
| | S + P + 2 | $Y_{2,5}$ | $Y_{2,6}$ | $V_{1,3}$ | $U_{1,3}$ |
| | S + P + 1 | $Y_{2,3}$ | $Y_{2,4}$ | $V_{1,2}$ | $U_{1,2}$ |
| | S + P + 0 | $Y_{2,1}$ | $Y_{2,2}$ | $V_{1,1}$ | $U_{1,1}$ |
| | S + N | Y1,Xr - 1 | Y1,Xr | V1,Xr/4 | U1,Xr/4 |

⋮

| LINE 1 | S + 7 | $Y_{1,15}$ | $Y_{1,16}$ | $V_{1,8}$ | $U_{1,8}$ |
| --- | --- | --- | --- | --- | --- |
| | S + 6 | $Y_{1,13}$ | $Y_{1,14}$ | $V_{1,7}$ | $U_{1,7}$ |
| | S + 5 | $Y_{1,11}$ | $Y_{1,12}$ | $V_{1,6}$ | $U_{1,6}$ |
| | S + 4 | $Y_{1,9}$ | $Y_{1,10}$ | $V_{1,5}$ | $U_{1,5}$ |
| | S + 3 | $Y_{1,7}$ | $Y_{1,8}$ | $V_{1,4}$ | $U_{1,4}$ |
| | S + 2 | $Y_{1,5}$ | $Y_{1,6}$ | $V_{1,3}$ | $U_{1,3}$ |
| | S + 1 | $Y_{1,3}$ | $Y_{1,4}$ | $V_{1,2}$ | $U_{1,2}$ |
| | S + 0 | $Y_{1,1}$ | $Y_{1,2}$ | $V_{1,1}$ | $U_{1,1}$ |
| | Address | Byte 0 | Byte 1 | Byte 2 | Byte 3 |

FIG. 6

| | | | | | | | | | |
|---|---|---|---|---|---|---|---|---|---|
| $Y_{1,1}$ | $Y_{1,2}$ | $Y_{1,3}$ | $Y_{1,4}$ | $Y_{1,5}$ | $Y_{1,6}$ | $Y_{1,7}$ | . | . | . |
| $Y_{2,1}$ | $Y_{2,2}$ | $Y_{2,3}$ | $Y_{2,4}$ | $Y_{2,5}$ | $Y_{2,6}$ | $Y_{2,7}$ | . | . | . |
| $Y_{3,1}$ | $Y_{3,2}$ | $Y_{3,3}$ | $Y_{3,4}$ | $Y_{3,5}$ | $Y_{3,6}$ | $Y_{3,7}$ | . | . | . |
| $Y_{4,1}$ | $Y_{4,2}$ | $Y_{4,3}$ | $Y_{4,4}$ | $Y_{4,5}$ | $Y_{4,6}$ | $Y_{4,7}$ | . | . | . |
| $Y_{5,1}$ | $Y_{5,2}$ | $Y_{5,3}$ | $Y_{5,4}$ | $Y_{5,5}$ | $Y_{5,6}$ | $Y_{5,7}$ | . | . | . |
| $Y_{6,1}$ | $Y_{6,2}$ | $Y_{6,3}$ | $Y_{6,4}$ | $Y_{6,5}$ | $Y_{6,6}$ | $Y_{6,7}$ | . | . | . |
| . | . | . | . | . | . | . | . | . | . |
| . | . | . | . | . | . | . | . | . | . |
| . | . | . | . | . | . | . | . | . | . |
| $V_{1,1}$ | $V_{1,2}$ | $V_{1,3}$ | $V_{1,4}$ | $V_{1,5}$ | $V_{1,6}$ | $V_{1,7}$ | | | |
| $V_{2,1}$ | $V_{2,2}$ | $V_{2,3}$ | $V_{2,4}$ | $V_{2,5}$ | $V_{2,6}$ | $V_{2,7}$ | . | . | . |
| $V_{3,1}$ | $V_{3,2}$ | $V_{3,3}$ | $V_{3,4}$ | $V_{3,5}$ | $V_{3,6}$ | $V_{3,7}$ | . | . | . |
| . | . | . | . | . | . | . | . | . | . |
| . | . | . | . | . | . | . | . | . | . |
| $U_{1,1}$ | $U_{1,2}$ | $U_{1,3}$ | $U_{1,4}$ | $U_{1,5}$ | $U_{1,6}$ | $U_{1,7}$ | . | . | . |
| $U_{1,1}$ | $U_{2,2}$ | $U_{2,3}$ | $U_{2,4}$ | $U_{2,5}$ | $U_{2,6}$ | $U_{2,7}$ | . | . | . |
| $U_{1,1}$ | $U_{3,2}$ | $U_{3,3}$ | $U_{3,4}$ | $U_{3,5}$ | $U_{3,6}$ | $U_{3,7}$ | . | . | . |
| . | . | . | . | . | . | . | . | . | . |
| . | . | . | . | . | . | . | . | . | . |

FIG. 7

HARDWARE ASSIST FOR YUV DATA FORMAT CONVERSION TO SOFTWARE MPEG DECODER

RELATED APPLICATION

This application is a continuation of U.S. patent application Ser. No. 08/619,203, filed on Mar. 21, 1996 now U.S. Pat. No. 6,005,546.

FIELD OF THE INVENTION

The present invention relates to an apparatus and method for generating a display image including video portions. In particular, the apparatus and method of the present invention may be utilized to assist a software embodied MPEG (Motion Picture Encoding Group) decoder to generate video images.

BACKGROUND OF THE INVENTION

Personal computers may be used to generate displays including video portions. For the purposes of the present application, the term "video" refers to full motion video images (e.g., derived from TV, film, video or the like) such as Cirrus Logic MotionVideo™ type displays. MotionVideo Architecture (MVA™) is described, for example, in co-pending U.S. patent application Ser. No. 08/483,584, entitled "DUAL DISPLAYS HAVING INDEPENDENT RESOLUTIONS AND REFRESH DATES", filed Jun. 7, 1995 and incorporated herein by reference. Such video portions may be generated from a data source (e.g., CD-ROM) where video data may be encoded in one of a number of formats (e.g., MPEG-I, MPEG-II, Indeo™ or the like).

Traditionally, MPEG decoding may be performed by a dedicated hardware decoder. A hardware MPEG decoder may receive MPEG encoded data from a data source (e.g., CD-ROM) and output YUV data to discrete portions of display memory of a display controller, as illustrated in FIG. 2.

Figure 2:
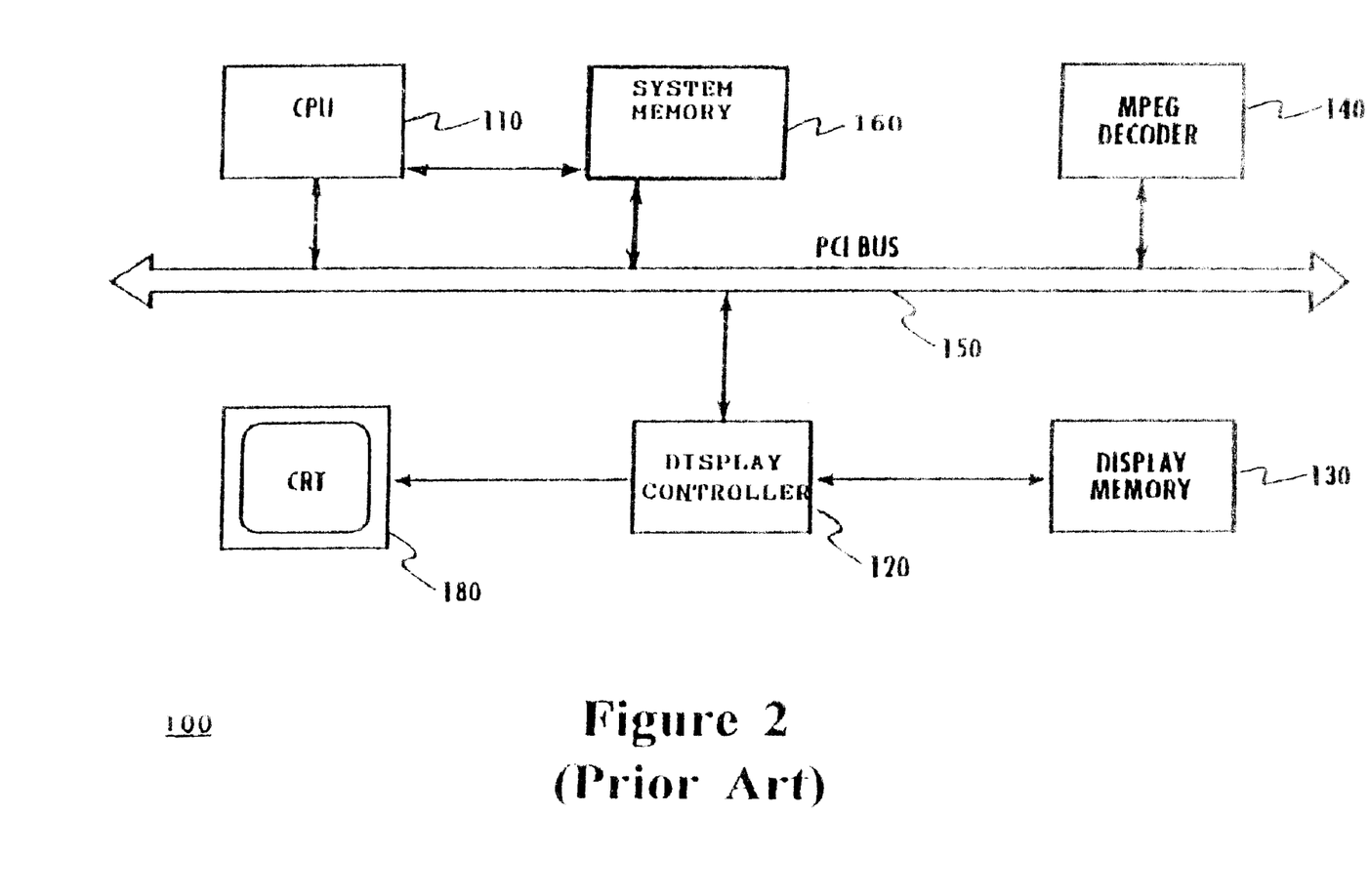
FIG. 2 is a simplified block diagram of a prior art personal computer illustrating the relationship between a microprocessor, an MPEG decoder, a display controller, display memory.

FIG. 2 is a block diagram illustrating major components of a computer system 100 provided with display controller 120 (e.g., Video Graphics Adapter (VGA), Super VGA (SVGA) or the like). Display controller 120 may generate pixel data for display 180 (e.g., CRT, flat panel display or the like) a t a rate characteristic of the refresh rate of display 180 (e.g., 60 Hz, 72 Hz, 75 Hz, or the like) and horizontal and vertical resolution of a display image (e.g., 640×480 pixels, 1024×768 pixels, 800×600 pixels or the like). A continuous stream of pixel data may be generated by display controller 120 at the characteristic rate of display 180.

Display controller 120 may be provided with a display memory 130 which may store pixel data in text, graphics, or video modes for output to display 180. Host CPU 110 may be coupled to display controller 120 through bus 150 and may update the contents of display memory 130 when a display image for display 180 is to be altered. Bus 150 may comprise, for example, a PCI bus or the like. System memory 160 may be provided coupled to Host CPU 110 for storing data.

Hardware MPEG decoder 140 may be provided to decode MPEG video data from an MPEG video data source (e.g., CD-ROM or the like) and output decoded video data to system memory 160 or directly to display memory 130. However, with the advent of increasingly powerful and faster microprocessors (e.g., Pentium™ or PowerPC™ processor or the like) it may be possible to implement MPEG decoding (or the like) entirely within software operating within host CPU 110. For example, future versions of Microsoft® Windows 95™ may include such MPEG decoding software. Intel® also offers a software video decoding technique under the trademark Indeo™.

Applications software or operating systems (e.g., Windows™ 95) may be provided with such MPEG or Indeo™ decoding software. Placing MPEG or Indeo™ decoding software within applications software or an operating system may allow a user to view video portions on a display screen without the need for purchasing additional hardware such as dedicated MPEG hardware decoder 140.

However, even with high performance microprocessors, decoding of MPEG data may be a host CPU intensive operation, which may degrade overall performance of computer system 100. A large portion of host CPU cycles required to implement MPEG decoding may be required for data transfer and formatting, rather than decoding per se.

MPEG data may be decoded and decompressed (in software and/or hardware) from an MPEG data source in several steps. Host CPU 110 (or dedicated MPEG decoder 140) may retrieve compressed/encoded MPEG data from an MPEG data source (e.g., CD-ROM or the like) and first perform a Huffman decoding, followed by inverse quantization of data, inverse DCT (Discrete Cosine Transform), and motion compensation (compression between frames). For software MPEG decoding, a 90 MHz Pentium™ microprocessor may be just barely able keep up with these first four steps at a rate of 30 frames per second.

Once decoded and decompressed, MPEG data in YUV format may be transferred from component YUV video (i.e., planar form) to a pixel video format (i.e., raster scan format). The pixel video YUV data may then be converted from YUV to RGB (Red, Blue and Green pixel data) and then stored in display memory 130 to be displayed on display 180. Prior art hardware video accelerators may handle the YUV to RGB conversion step to remove that task from host CPU 110. However, the step of formatting YUV component data to pixel video form may still be required.

Formatting YUV component data to pixel video form may require host CPU 110 (for hardware MPEG decoding, MPEG decoder 140) to decode MPEG data, as discussed above into a YUV 4:2:2 video format (i.e., CCIR 601 format) where groups of two pixels may be encoded as two bytes of luminance (Y) data as well as two bytes of chrominance difference (U,V) data. Display 180 and display controller 120 may require that output data be generated in a basic pixel video (i.e., scan line) format such that all data (e.g., RGB or YUV) for each output pixel located in consecutive locations within display memory 130.

In a YUV 4:2:2 format, two bytes of Y data may be followed by one byte of U data and one byte of V data. Each double word (DWORD) read out may thus comprise information for two adjacent pixels of data which may be read by display controller 120 in sequential addresses to be consistent with pixel video methods of display and make best use of available memory bandwidth.

Figure 1A:
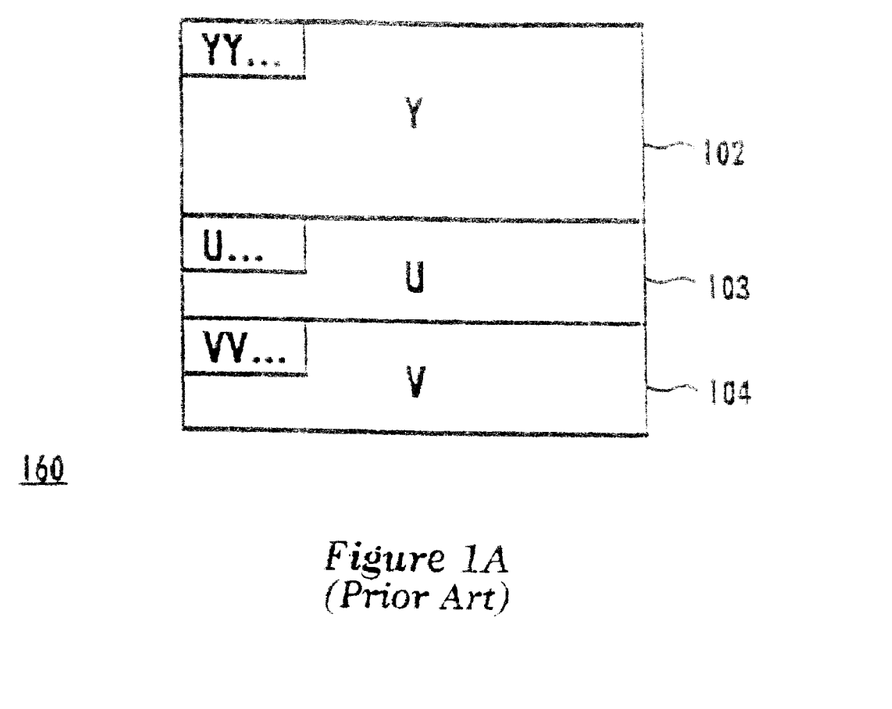
FIG. 1A is a diagram illustrating how Y, U, and V data may be stored in system memory in a prior art software MPEG decoding scheme.

Prior art MPEG decoding techniques (hardware or software) may first decompress MPEG data from an MPEG data source (e.g., CD-ROM or the like) into separate Y, U, and v values. These Y, U, and V values may then be stored initially into separate Y, U, and V memory areas (planes) in system memory 160 as illustrated in FIG. 1A in a format known as YUV planar format or component YUV.

System memory 160 may comprise separate contiguous areas of memory 102, 103 and 104 for storing Y, U and V data, respectively. For video data in the CCIR 601 format, two Y values may be provided for each U and V values to comprise pixel data for two adjacent pixels. Thus, the Y portion of system memory 160 may be twice as large as each of the respective U and V portions 103 and 104.

To combine separate Y, U, and V data into a format convenient for prior art video accelerators, host CPU 110 may first read two bytes of data from system memory area 102 containing Y data and shift one of those bytes over to a different byte location within a 32 bit DWORD register within host CPU 110. Next, host CPU 110 may read a byte of U data from the U area 103 of system memory 160 and then read a byte of V data from the V area 104 of system memory 160. Host CPU 110 may then combine separate Y, U, and V data into a YUV 4:2:2 formatted DWORD which in turn may be transferred to display memory 130.

Such byte shifting operations are not particularly efficient for such processors as the Pentium® processor and thus system performance may be degraded, because a significant percentage of the CPU cycle would be used just for data reformatting (i.e., component YUV to pixel video). Moreover, reading separate Y, U, and V data from non-contiguous portions of system memory 160 may require a large number of random access memory cycles, which will not get page cycles across the bus, further degrading system performance.

For a PCI bus system, it may be possible to combine separate read cycles in an internal cache within host CPU 110. However, processor and read cycle overhead may prevent system 100 from taking full advantage of burst cycles available in PCI bus architecture.

Figure 1B:
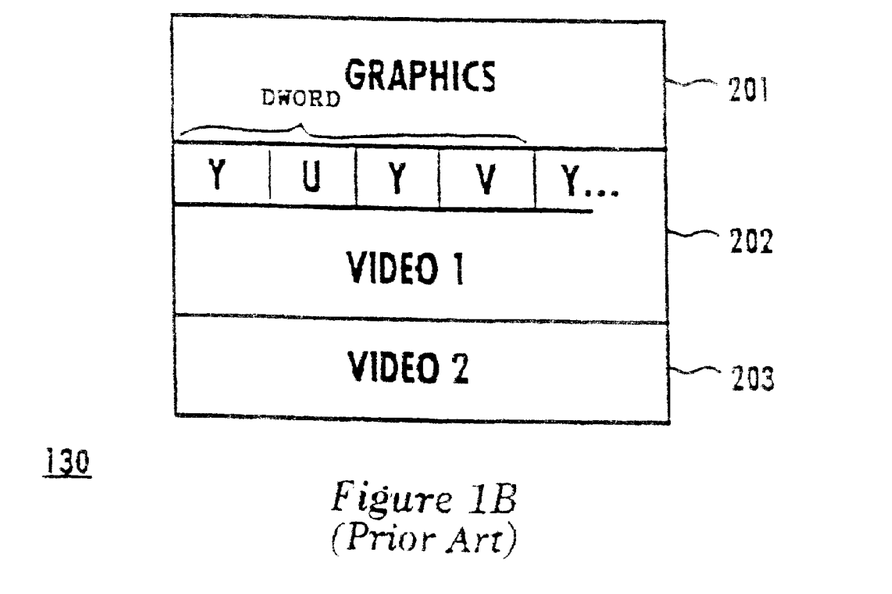
FIG. 1B is a diagram illustrating how Y, U, and V data may be stored in display memory in pixel video form in a prior art software MPEG decoding scheme.

Once a YUV 4:2:2 formatted DWORD has been assembled within host CPU 110, it may then be stored in display memory 130 in a rasterized (i.e., pixel video) format as illustrated in FIG. 1B. Display memory 130 may comprise graphics portion 201 for storing graphics data (e.g., Windows™ Graphical User Interface (GUI) data), and one or more video buffers 202 and 203 for storing video data representing full motion video images (e.g., Cirrus Logic MotionVideo™ images). Two video buffers 202 and 203 may be provided to prevent generation of artifacts on display 180.

If host CPU 110 were writing into the same area of display memory 130 simultaneously being used for generating an image on display 180, such writing action may be visible on display 180. A user might perceive CPU writes to display memory 130 as it is being painted or as tearing effect, as sometimes occurs, for example, in video games.

In prior art display controllers, such artifacts may be eliminated by double buffering video data. Separate video buffers 202 and 203 may be provided within display memory 130 to store consecutive frames of video data. Host CPU 110 may write to one video buffer 202 within display memory 130 while data from another buffer 203 is being read out to display 180. Such double buffering may not require large amounts of display memory 130, as MPEG video data may typically be rendered at a resolution of 352 by 240 pixels, which may be zoomed up to any size including full display resolution (e.g., 1024 by 768 pixels).

One difficulty encountered in double-buffering display data is that a mechanism must be provided to instruct host CPU 110 and display controller 120 to switch their respective write and read cycles alternatively from video buffers 202 and 203. If display controller 120 is reading display data from the same video buffer 202 or 203 which host CPU 110 is writing to, the advantage of double buffering may be negated. Upon completing a write cycle to fill one of video buffer 202 or 203, display controller 120 need be signaled to switch reading from the other of video buffers 202 and 203.

A YUV formatted DWORD may be stored in pixel video format within video buffer 202 or 203 of display memory 130. Display controller 120 may readily generate video images from pixel video YUV data stored within video buffer 202 or 203 of display memory 130.

One processor intensive portion of software MPEG decoding, therefore, is the method of transferring the planes of Y, U, and V data from system memory 160 into display memory 130 in a pixel video format. Another processor intensive portion of software MPEG decoding is the need to vertically up-sample chrominance difference (U,V) data. Data encoded in an MPEG format has the same number of luminance (Y) samples (or bytes) as there are actual pixels displayed for the resulting playback. However chrominance difference samples (U and V) played back are sub-sampled both horizontally and vertically (e.g., one V and U data pair for each 2×2 block of Y data).

The MPEG encoding technique may encode pixel data from blocks of four luminance samples in a two dimensional pattern (e.g., two by two pixels) for every one pair of chrominance difference samples (U,V). Chrominance difference samples (U,V) may actually be sub-sampled from the center point of a two by two pixel block. Upon decompression, chrominance difference data (U,V) may be replicated to create chrominance difference samples for groups of two pixels in the YUV 4:2:2 format.

Figure 1C:
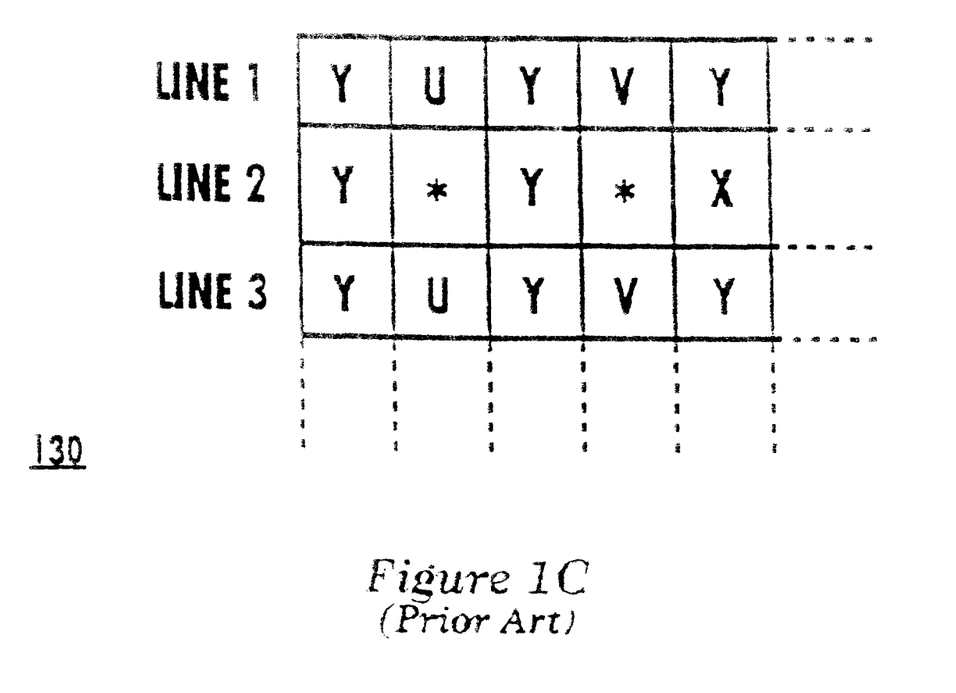
FIG. 1C is a diagram illustrating how vertical interpolation of U and V data stored in display memory may be required in a prior art software MPEG decoding scheme.

FIG. 1C illustrates how horizontal and vertical sub-sampling may occur to create interpolated U and V values. FIG. 1C illustrates Y, U, and V values stored in display memory 130. As data is stored in display memory 130 in a pixel video format (e.g., scan line by scan line) it may be a relatively easy task to interpolate U and V data horizontally. However, as U and V data is sub-sampled in both horizontal and vertical directions, it may be necessary to interpolate (or replicate) U and V data in a vertical direction.

Thus, for example, as illustrated in FIG. 1C, every other line of video data may require interpolation (or replication) of U and V data from other adjacent lines, to create U and V values to fill in the areas in indicated by the * values in FIG. 1C. Unfortunately, such vertical interpolation may be much more difficult to achieve than horizontal interpolation. Data from adjacent lines may need to be stored for later replication (or interpolation) when data for a particular line is stored in display memory 130.

Such storage of adjacent U and V values may require large amounts of memory or register space and may require cumbersome processor operations. It would be desirable, therefore, to reduce data bandwidth between host CPU 110 and display memory 130 by transferring only those chrominance difference (U,V) data decoded and perform replication of such data within display controller 120.

SUMMARY OF THE INVENTION

The present invention comprises a display controller which may assist a host processor in decoding MPEG data. The display controller of the present invention may receive YUV data in non-pixel video format from a host CPU and perform the otherwise CPU intensive task of rasterization within the display controller. In addition, the display controller may use its internal BITBLIT engine (a feature common in advanced SVC-A display controllers) to copy U and V data from one line in a BITBLIT operation to adjacent lines, so as to replicate U and V data. A byte mask preserves Y data on the adjacent lines from being overwritten. At the end of the BITBLIT operation, the display controller generates a signal indicating that the frame buffer has been filled with new data, and thus display controller automatically switches to reading from the newly written frame buffer.

DETAILED DESCRIPTION OF THE INVENTION

Figure 3:
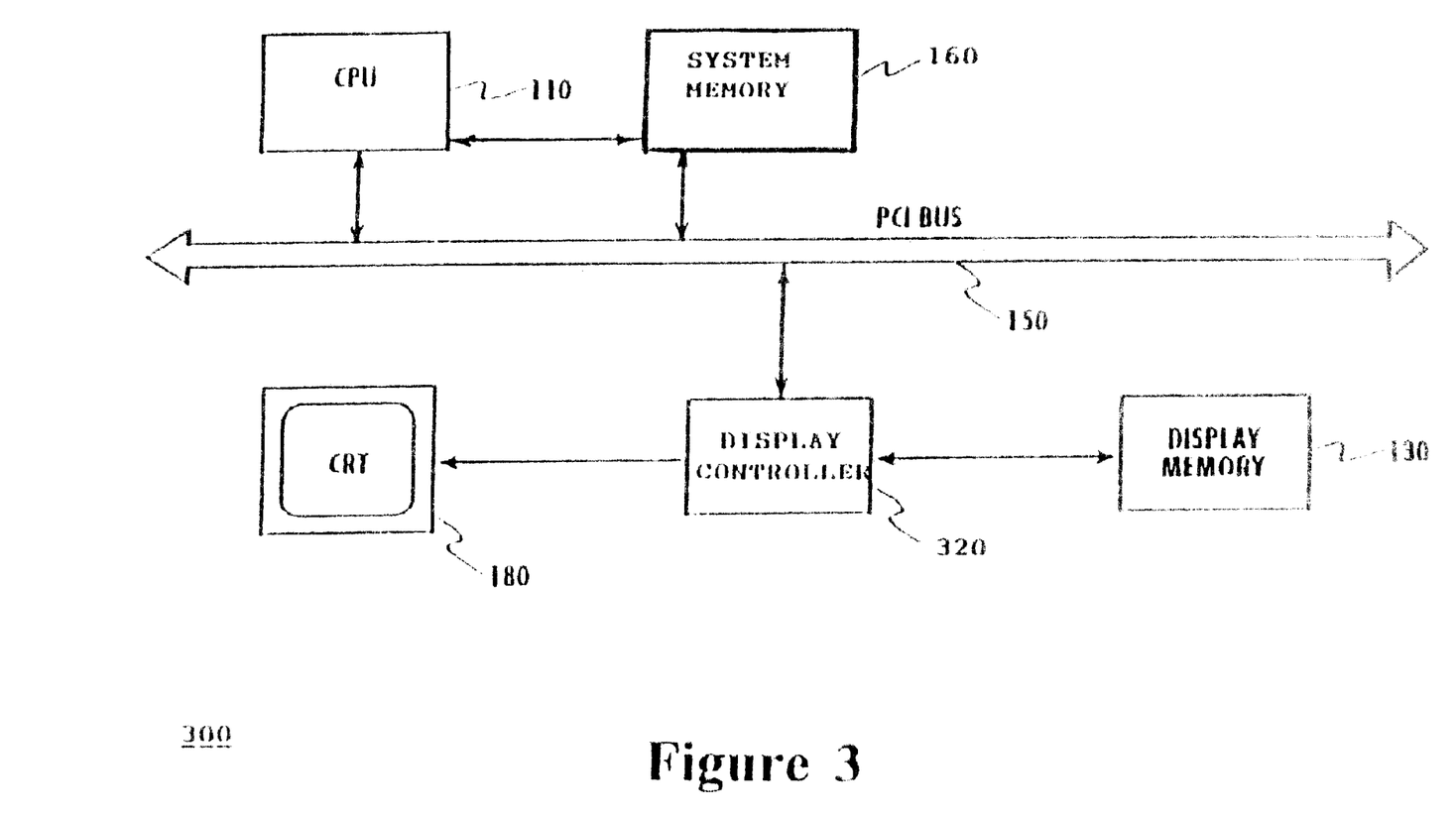
FIG. 3 is a block diagram illustrating the arrangement of components in a computer system using software MPEG decoding with the display controller of the present invention.
Figure 4:
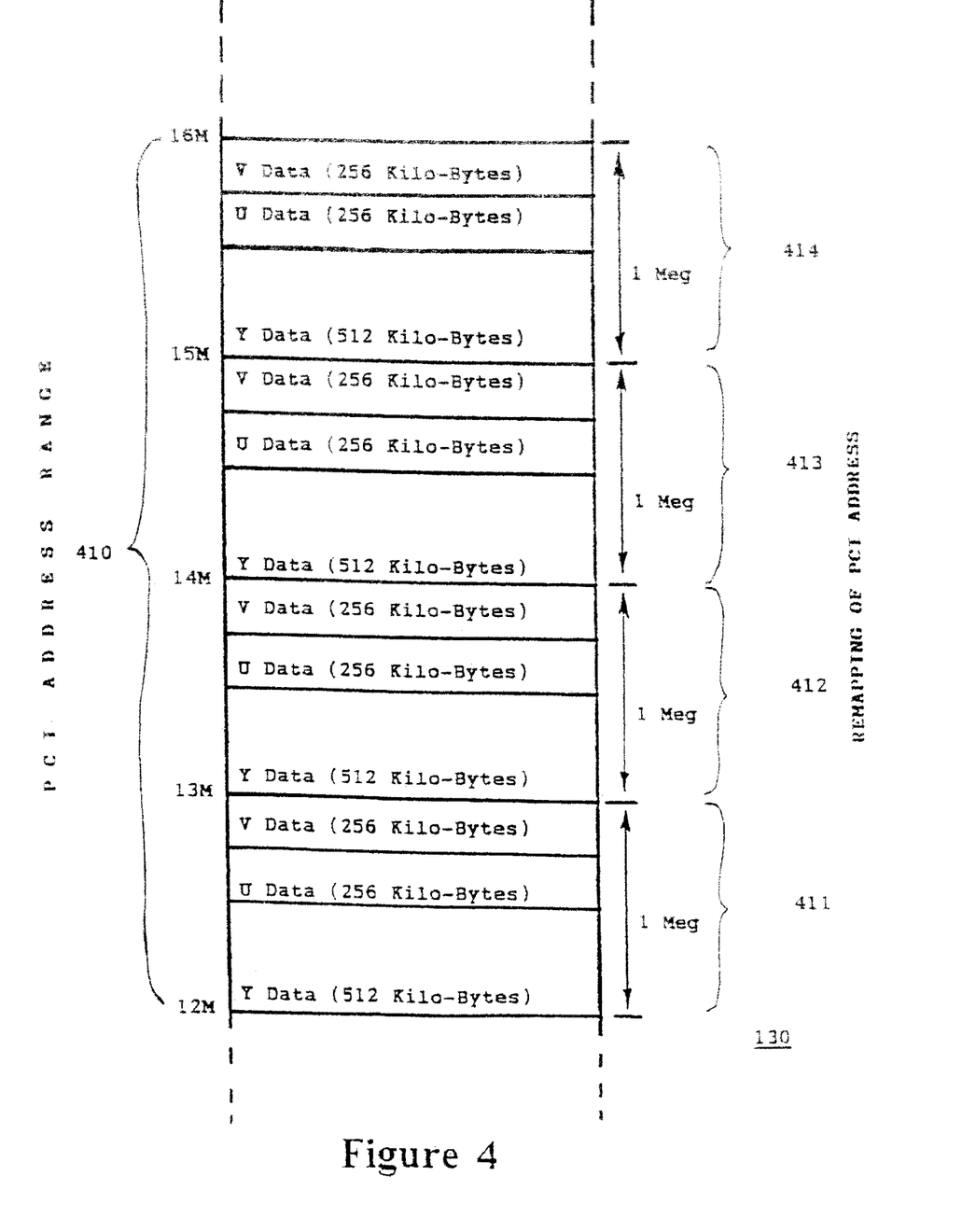
FIG. 4 is a memory map illustrating a PCI location of a memory address range being mapped to an address range of display memory 130 of FIG. 3 for storing component YUV data.
Figure 5:
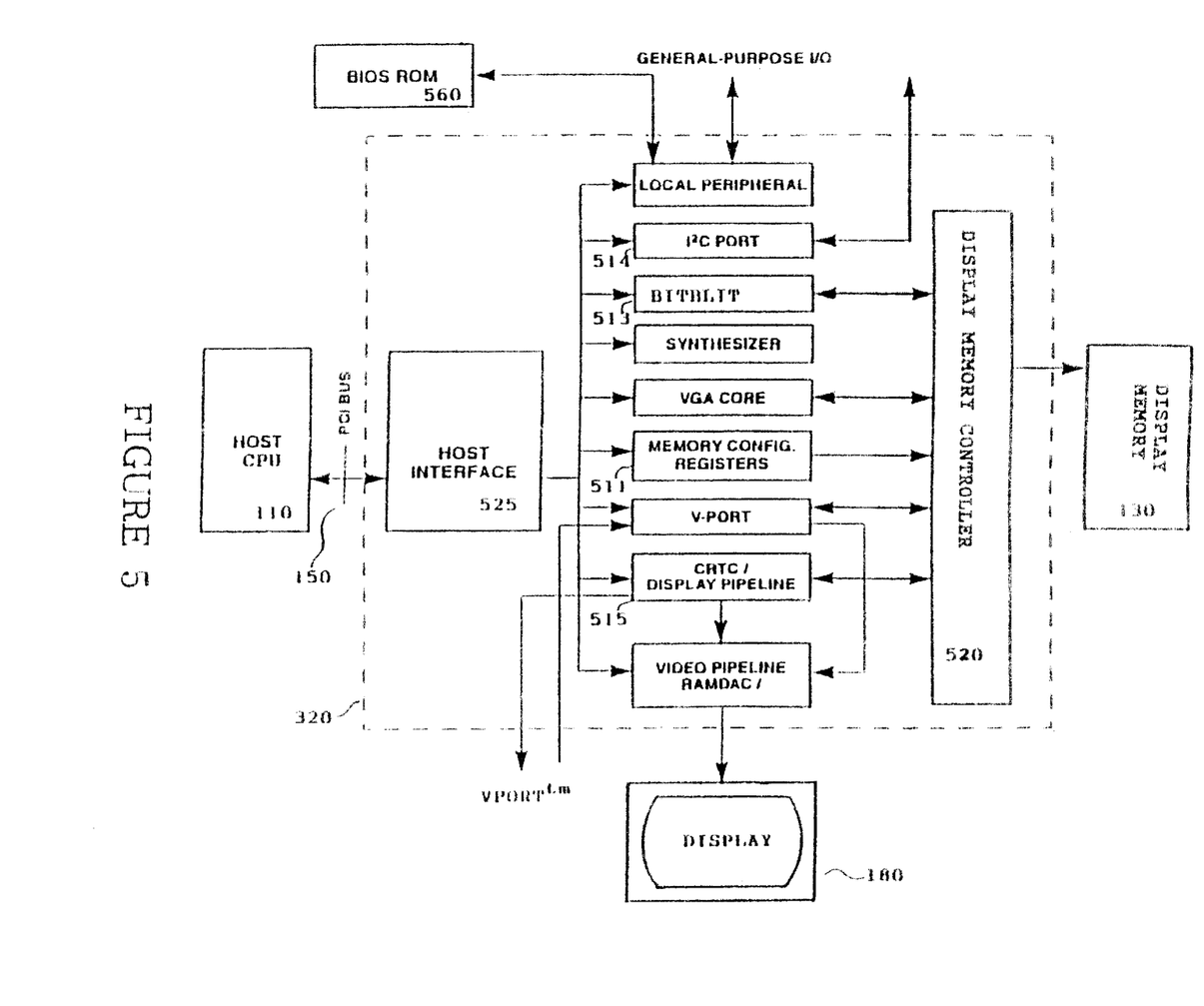
FIG. 5 is a block diagram of one embodiment of display controller 320 of FIG. 3.

Referring now to FIGS. 3, 4, and 5, display controller 320, coupled to PCI bus 150, may be allocated a 16 megabyte address space for its use out of the possible 4 Giga-Bytes of 32-bit addressing for the PCI bus protocol. Display controller 320 may be provided with a base address as part of the PCI bus protocol. Display controller 320, in the preferred embodiment, may support up to 4 megabytes of display memory 130.

Display controller 320 may be provided with byte swapping modes, as PCI bus 150 may be used with different types of processors which use different byte ordering (i.e, Bi-endian support). To accelerate rasterization of YUV video data from system memory 160 to display memory 130, a planar methodology may be used to transfer YUV data from system memory 160 to display memory 130.

In prior art PCI bus devices, every device which may have memory may be mapped to the PCI memory space. Devices, such as display controller 320 may be provided with a PCI configuration register 511 which may be at a specific address location (e.g., 10 hex) defined by the PCI specification. An address stored in PCI configuration register 511 may become a base address for display memory 130.

Host CPU 110 may load a base address into the PCI configuration register 511 as part of a memory management routine upon system power-on. An address stored in PCI configuration register 511 may become an address reference point for the linear frame buffer or linear memory space of display controller 320.

In prior art PCI bus display controller devices, it is known to request 16 megabytes worth of address space, even though most display controllers may use only four megabytes of actual memory. The requested 16 megabytes may be divided into four almost identical regions. Each four megabyte range of the requested 16 megabyte range may map directly to the same four megabyte physical display memory.

In the prior art, the first four megabytes of address space may be used for ordinary memory writes to display memory, without altering any byte ordering. The second four megabyte range may perform a word switching byte re-ordering which may be required with some types of CPUs. In other words, if host CPU 110 were to write data to the second four megabyte range (or "aperture"), display controller 120 may reorder such data on a word basis before storing to display memory 130.

Similarly, the third, four megabyte address range may perform another type of byte swapping on a DWORD basis to also compensate for byte ordering used by other types of CPUs. In prior art display controller 120, the fourth four megabyte range may be reserved for future use. In any event, however, all four megabyte ranges end up mapping to the same four megabytes of physical display memory 130.

Referring now to FIG. 4, in the present invention, a memory address aperture 410 may be enabled in the fourth linear address aperture discussed above (i.e., CR3F[4]=1 and CR3E[3:1]=000) of display memory 130. Aperture 410 may be mapped to four physical megabytes of display memory 130. Addresses for aperture 410 may be determined by an address set by PCI configuration register 511 containing 10H as a base address. Thus, the address range for the four megabytes of display memory may be set to range from {PCI 10H base address+12 megabytes} to {PCI 10H base address+16 megabytes −1 byte}.

The four megabyte fourth linear aperture 410 may be further divided into one megabyte sections 411, 412, 413, and 414 as illustrated in FIG. 4. Each one megabyte address range 411, 412, 413, and 414 may correspond to the same 1 megabyte of the first or primary aperture of physical display memory 130. Within each 1 megabyte region, Y, U, and V data may be arranged in three contiguous ranges.

Host CPU 110 may transfer Y data over PCI 150 bus to a Y range within regions 411, 412, 413, and 414. CPU 110 may transfer Y data in a component YUV mode and thus take advantage of the PCI burst cycle as well as page mode access within system memory 160. Display controller 320, however, stores received Y data in a pixel video format within display memory 130, as illustrated in FIG. 6.

Display controller 320 may place a byte of received Y data in consecutive odd byte locations on succeeding lines by performing an address translation on incoming Y data. Thus, to host CPU 110, display memory 130 appears to contain Y data in a contiguous, component YUV arrangement, whereas the Y data is actually stored in display memory 130 in pixel video format.

Similarly, U and V data, when transferred from host CPU 110 to display memory 130, may be stored in pixel video format by display controller 320. Display controller 320 may place U data in every fourth byte location (starting with a second byte location) in every alternate scan line, as illustrated in FIG. 6. Similarly, display controller 320 may place V data in every fourth byte location (starting with a fourth byte location) in every alternate scan line, also as illustrated in FIG. 6.

Figure 6:
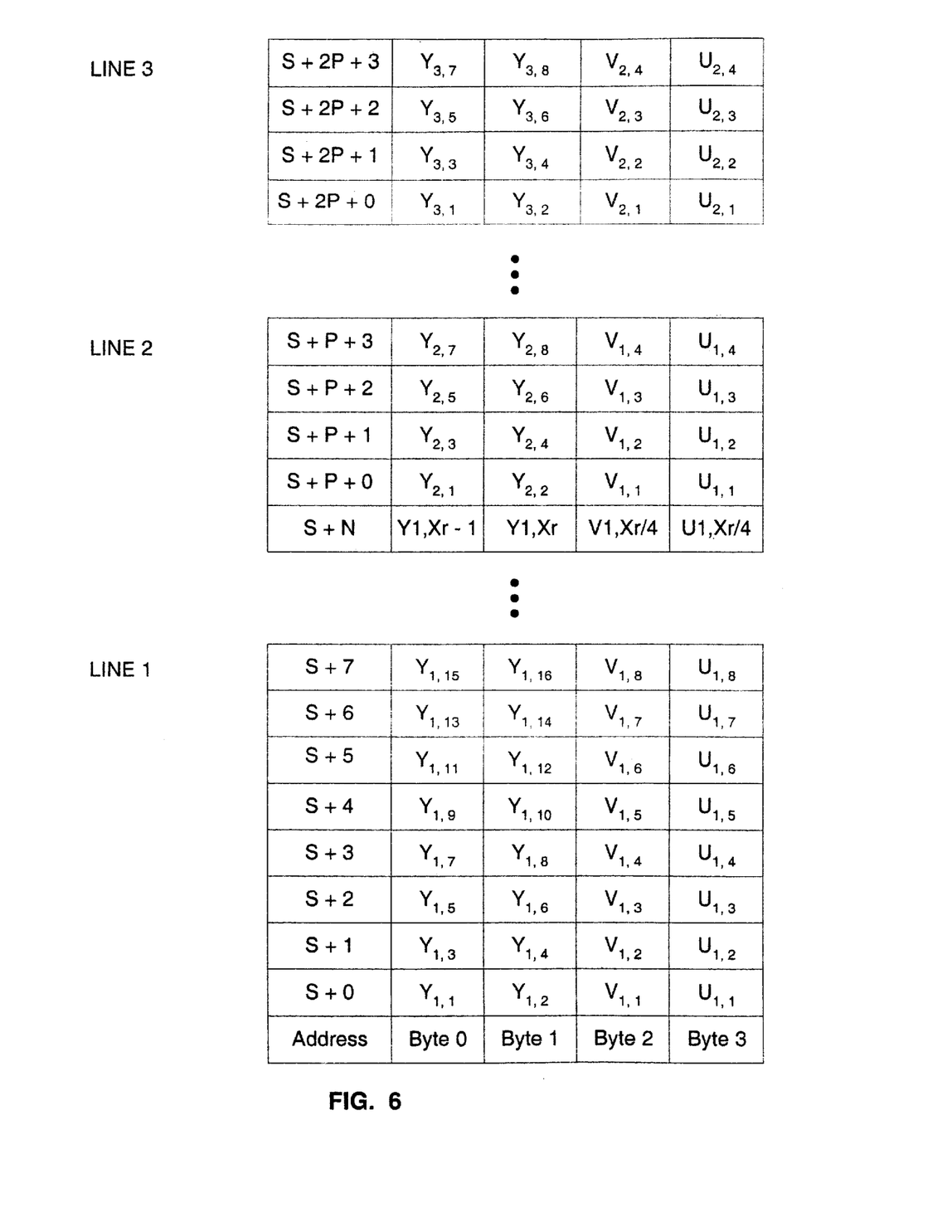
FIG. 6 is a diagram illustrating storage of Y, U, and V components within display memory 130 of FIG. 3.
Figure 7:
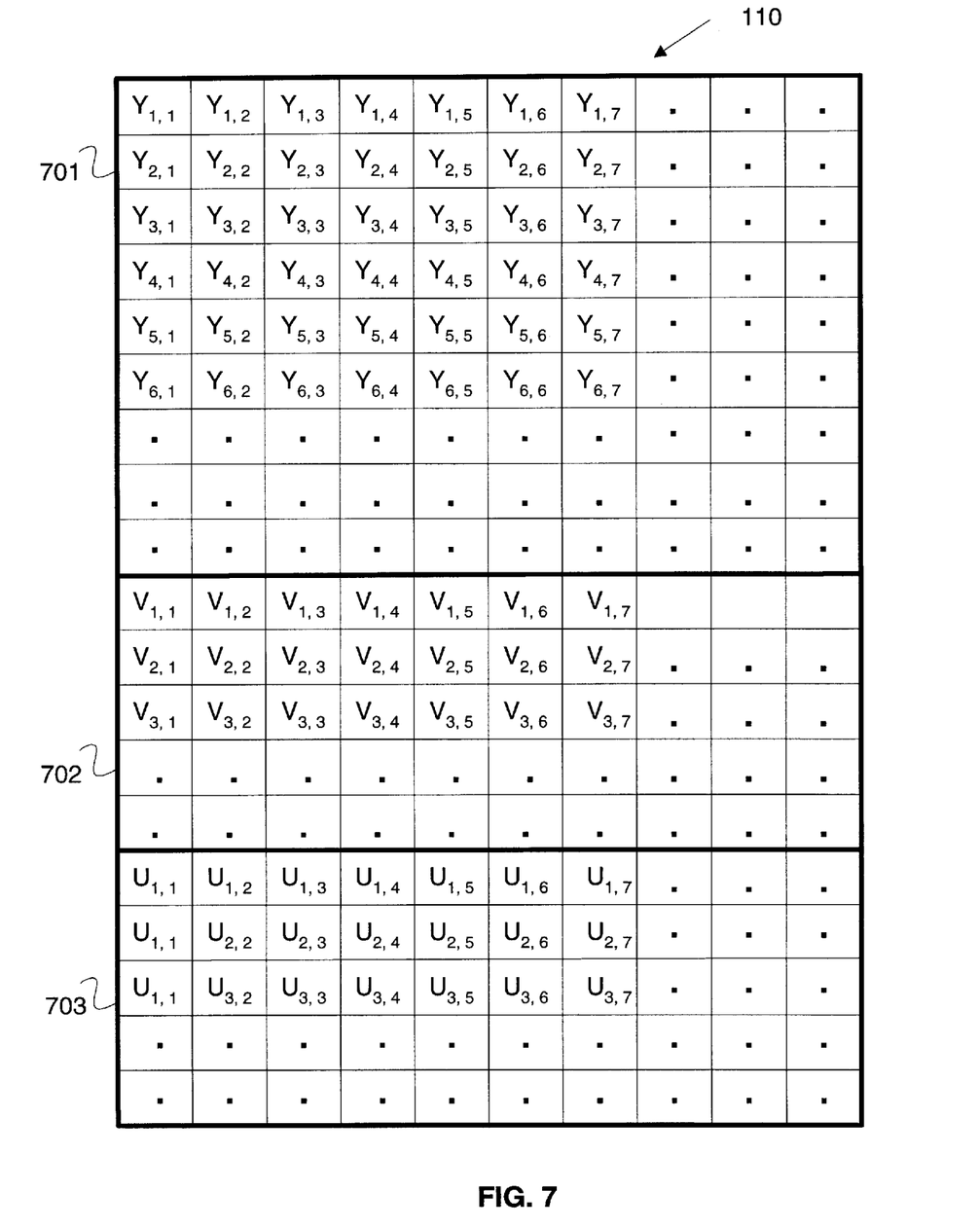
FIG. 7 is a diagram illustrating storage of Y, U, and V data within system memory 160 of FIG. 3.

FIG. 6 illustrates the format for writing three lines of YUV data in CCIR 601 (YUV 4:2:2) format into display memory 130. YUV data in FIG. 6 may be represented in the form of Ya,b (or Va,b or Ua,b) where a represents vertical position (line number), and b represents horizontal position. FIG. 7 illustrates the location of YUV source data within system memory 160.

For an image size of $x_r$ by $y_r$ pixels, where $x_r$ is the horizontal resolution in pixels and $Y_r$ is the vertical resolution in pixels, positions for Y,U, and V data will be:

Ya,b: where a=1 to $x_r$ and b=1 to $y_r$.

Ua,b: where a=1 to $x_r/2$ and b=1 to $y_r/2$.

Va,b: where a=1 to $x_r/2$ and b=1 to $Y_r/2$.

Thus, each U, and V plane of system memory 160 may be written twice into display memory 130 as illustrated in FIG 6. FIG. 6 illustrates writing of three lines of YUV 4:2:2 data into display memory 130 from system memory 160 using byte planes for a 32-bit display memory controller 520. The address for each DWORD of data is illustrated in FIG. 6, where:

S=the starting address for the video window buffer (202 or 203).

P=window line offset (in DWORDs)

n=$X_r/2$ (one-half the width of the video window)

Source YUV data from system memory 160 may be stored as illustrated in FIG. 7. Within system memory 160, YUV data may be stored in discrete Y, U, and V portions 701, 702, and 703, in a similar manner to that illustrated in prior art FIG. 1A.

The diagram of FIG. 6 illustrates how the contents of display memory 130 may appear to display controller 320. Host CPU 110, through PCI bus 150, however, stores Y, U, and V data in a component YUV mode, writing Y, U, and V data to display memory 130 through the fourth aperture in contiguous transfers of first Y data (for one frame) followed by V data (for one frame) and U data (for one frame). Such a transfer technique allows host CPU 110 to take advantage of page mode read cycles from system memory 120, as well as PCI burst cycle modes.

While host CPU 110 is writing data to the fourth aperture, display controller 320 automatically takes every two bytes of Y data received and writes that data into byte lanes BYTE0 and BYTE1 of FIG. 6. Display memory 130 may be read on a DWORD basis (e.g., four bytes at a time). In the prior art, it is known to call each byte of a DWORD read as a byte lane. Even 64-bit graphics controller may be viewed as containing two DWORDS in consecutive addresses, having four byte lanes within them. Prior art IBM EGA/VGA controllers may refer to such byte lanes as byte planes.

Display controller 320 takes the address supplied by host CPU 110 and shifts that address by one bit, thus taking each word of source data from PCI bus 150 and storing the resultant data at an actual physical address within display memory 130. Each address may take a full and aligned DWORD or four bytes of data out of display memory 130. In an alternative embodiment, using other wider bus and/or memory widths, the width of display memory could be 64 bits wide (e.g., two DWORDs in parallel).

Each DWORD of YUV 4:2:2 data may extend through planes of contiguous DWORDS. The first byte (BYTE0) of each DWORD may lie within a plane of a first portion of luminance (Y) data. The second byte (BYTE1) of each DWORD may lie within a plane of another portion of luminance (Y) data. The third byte (BYTE2) may lie within a plane of V chrominance data. The last byte (BYTE3) may lie within a plane of U chrominance data.

When data from PCI bus 150 is written to display memory 130 through the fourth aperture, display controller 320 may detect that a memory write has occurred to the address range from the first 512K addresses within the corresponding special 1 megabyte region with the four megabyte video range as illustrated in FIG. 6. When the address within that range is detected by memory controller 520, bus interface hardware 525 within display controller 320 may take every two bytes of data from PCI bus 150 (or a DWORD of data).

When Y data is sent through PCI bus 150, the first two bytes of that DWORD may be sent to display memory 130 at address S, offset zero. The next two bytes may be taken out of that DWORD and a second memory cycle may takes place at a different address incremented by one (S+1) and be written display memory 130 at the next DWORD address, as illustrated in FIG. 6.

The 512 K address range from PCI bus 150 may thus effectively be multiplied by two in order to have a direct mapping to one megabyte worth of display memory 130, or actually four 256 kilobyte planes (or byte lanes) of memory. Each plane or byte lane may thus have a linear address range of 1 megabyte. However, the DWORD granularity of the addresses is 1 megabyte divided by four, or each byte lane or byte plane is 256 kilobytes of DWORD addresses. Four byte planes together thus form one megabyte worth of linear bytes, as illustrated in FIG. 6.

Dividing a four megabyte aperture of display memory 130 into four one megabyte sections may be more convenient for hardware within display controller 320. However, it is within the spirit and scope of the present invention to provide one contiguous range of addresses, where, for example, the first two megabytes of addressed may correspond to four megabytes of physical memory. However, as display memory may comprise as little as one megabyte of physical memory, four byte lanes may be preferred.

The operation of display controller 320 will be illustrated by way of example. For example, display memory 130 may comprise one megabyte of display memory, and display controller 320 may be operating in a 1024 by 768 graphics mode at eight bits per pixel (bpp) pixel depth. Video images, having a resolution of 352 by 240 pixels may be decoded into YUV data using software operating on host CPU 110 and stored in system memory 160 as illustrated in FIG. 1A.

The number of Y data values for this example would be 352×240 or 84480 bytes (at 8 bits per Y sample). The number of U and V bytes, respectively would be 176×120 or 21120, or one U,V pair for each 2 by 2 block of Y values. A video window line address offset represents an arbitrary size for each video line, preferably a number equal to or greater than the line length of the video window image. In this example, 360 bytes has been chosen, making a line length eight bytes longer than the actual 352 pixel line length may require.

A window start address indicates where in display memory 130 a video buffer may be located. In this example, with one megabyte of physical DRAM for display memory 130, display resolution is at 1024 by 768 at eight bpp graphics mode. Thus, the actual graphics portion of display memory 130 may occupy the first 768 kilobytes of display memory 130, leaving then any place above that 768 kilobytes available for a video buffer.

Display controller 320 may then read a separate area of display memory 130 for video and graphics portions of a display image, as the two areas may be in different color spaces (e.g., 8 bpp for graphics, 24 bpp for video), as is known in the art. When YUV data is transferred to display memory 130, the first Y address for a frame may be set to window start address divided by two {768 kilobytes/2}. In this range, the address space of the first 512 kilobytes of Y values may be effectively expanded by the address translation scheme to double that, or one kilobyte of address space. Thus, display controller may divide an address from PCI bus 150 by two from where it would go in the frame buffer to take care of that address translation.

352 bytes of Y data may be written for one line. Thus the address range may be from {768 kilobytes/2} to {768 kilobytes/2+351}. The window line address offset for the video buffer space may then be added to the starting address of the previous line to yield an address for the start of a next line of Y data. The process may continue 240 lines, the height of the video window in this example.

Next, V data may be written from address {768 kilobytes/4+512 kilobytes}. One line of V data may be written (e.g., 176 Bytes). Then, the window line address offset (e.g., 360 bytes) may be twice added to the start address to skip one line of video data to leave one blank of V data to be filled in later. 120 lines of V data may thus be filled into alternate lines of display memory 130 as illustrated in FIG. 6.

U data may be written from address {768 kilobytes/4+ (512 kilobytes+256 kilobytes+768 kilobytes)} in a similar matter as V data discussed above, leaving every other V line blank to be filled in by later interpolation.

By translating YUV data from component YUV to pixel video storage formats, display controller 320 relieves host CPU 110 of a particularly cycle intensive task. Moreover, since the technique of the present invention utilizes a hitherto unused display memory address aperture, display controller 320 maintains compatibility with the PCI bus standard and prior art display controller software and hardware.

FIG. 5 is a block diagram of display controller 320. The apparatus and method of the present invention may be provided within one or more elements of display controller 320. In the preferred embodiment, display controller 320 may be provided with BITBLIT engine 513, I²C port 514, CRTC/display pipeline 515, and memory controller 520. Each of these elements may transfer data through memory controller 520 to display memory 130.

In FIG. 5, controller 320 may be coupled to host CPU 110 through system bus (PCI BUS) 150. Memory configuration registers 511 may store data values indicating the configuration of display memory 130. Such data values may be loaded upon reset from BIOS ROM 560 or may be programmed from Host CPU 110. Data values in memory configuration registers 511 may indicate locations of video buffers 202 and 203 within display memory 130. Memory controller 520 may utilize these data values, to translate X and Y coordinates of a bit block transfer into memory addresses for display memory 130.

Display controller 320 may be provided with a mechanism known as a BITBLIT engine 513. BITBLIT engine 513 provided within display controller 320 allows for high speed transfer of blocks of data from one portion of display memory 130 to another in an operation known as a bit-aligned block transfer.

A Bit-aligned Block Transfer (BITBLIT) is a general operator which provides a mechanism to move an arbitrary size rectangle of an image from one part of a display memory to another, possibly manipulating the data in some logical operation with the data at the destination to be written. For example, an OR operation may be performed to keep a graphical image as a background. This operation may be performed by hardware BITBLIT engine 513. Display controller 320 provided with this capability may be referred to as a display controller with a BITELIT engine or BITBLIT hardware accelerator.

In display controller 320 of the present invention, BITBLIT engine 513, which may be provided as a standard feature within display controllers 320 (as used for other purposes), may be designed to replicate U and V data to perform horizontal interpolation. Referring to FIG. 1C of the prior art, BITBLIT engine 513 of display controller 320 of the present invention may copy line 1 of pixel video YUV data into that portion of display memory 130 containing line 2.

A byte mask may be utilized to individually protect some of the bytes of the data to the destination area of the BITBLIT operation separately from other bytes on a per DWORD basis. Thus, BITBLIT engine 513 may operate such that the first byte and the third byte (i.e., Y values) of every DWORD sent from source to destination would not actually overwrite the destination, but actually only the second and fourth bytes (i.e., U and V values).

Replicating U and V (chrominance difference) values for adjacent lines may be sufficient to fully decompress MPEG data. The human eye is much less sensitive to chrominance than luminance, thus, any minor color distortion created by replicating (versus interpolating) U and V data may not be noticeable to the viewer.

In an alternative embodiment, U and V data may be replicated horizontally using the technique discussed above. In a second BITBLIT operation, U and V data from an adjacent line (source) may be combined with the replicated U and V data (destination) to create and write interpolated U and V values.

When the software MPEG decompressor operating in host CPU 110 completes transferring U and V data for a single frame, it may generate a signal over PCI bus 150 to display controller 320 that data transfer is complete. Display controller 320 may then trigger BITBLIT engine 513 to replicate chrominance difference data (U,V) to alternate scan lines. This BITBLIT operation may take place concurrently while host CPU 110 is assembling and decompressing data for a next frame of data, thereby offering a bit more assistance to video playback performance.

When the BITBLIT operation is completed, BITBLIT engine 513 may synchronously trigger memory controller 520 to switch between video buffers 202 and 203 of display memory 130. Thus, correct switching for display controller 320 to read data out to display 180 is maintained. If display controller 320 were to switch video buffers 202 and 203 based upon the completion signal from host CPU 110, output data may be distorted, as display controller 320 may be performing a BITBLIT operation on data within that video buffer 202 or 203.

Switching of video buffers 202 and 203 could be performed by host CPU 101. However such a technique require host CPU 101 to periodically poll display controller 320 to check when the BITBLIT UV replication operation is done and trigger switching of video buffers 202 and 203. Thus, display controller 320 releases host CPU 110 from yet another task. Host CPU 110 need only check video buffers 202 and 203 when host CPU 110 is ready to begin writing data to either of video buffers 202 and 203. Host CPU 110 may then check to see if a buffer is available.

Thus, the software MPEG decoder will be up and writing to one of video buffers 202 and 203 while the display controller 320 is playing back from the other of video buffers 202 and 203 from some previously completed frame.

While the preferred embodiment and various alternative embodiments of the invention have been disclosed and described in detail herein, it may be apparent to those skilled in the art that various changes in form and detail may be made therein without departing from the spirit and scope thereof.

What is claimed is:

1. A display controller for receiving video data from a data bus in a component YUV format and storing the video data to a display memory in a pixel video format, the display controller comprising:
 a bus interface, coupled to the data bus, for receiving video data in a component YUV format and corresponding video data addresses within a predetermined address range;
 a display memory controller, coupled to said bus interface, for receiving video data in a component YUV format in contiguous successive streams of luminance and chrominance difference data and corresponding video data addresses within a predetermined address range and for storing said video data by directing separate luminance and chrominance difference data into predetermined memory portions according to a predetermined memory aperture so as to store said video data in a pixel video format in a display memory; and
 a memory configuration-register coupled to the bus interface and the display memory controller and configured to set addresses for the predetermined memory aperture.

2. The display controller of claim 1 wherein said video data comprises luminance and chrominance difference data and said component YUV format comprises a first contiguous block of luminance data and at least a second contiguous block of chrominance difference data.

3. The display controller of claim 2 wherein said display memory controller receives the first contiguous block of luminance data and stores the first contiguous block of luminance data in at least one byte lane within the display memory.

4. The display controller of claim 3 wherein said display memory controller receives the at least a second contiguous block of chrominance difference data and stores the at least a second contiguous block of chrominance difference data in at least another byte lane within the display memory.

5. The display controller of claim 4, wherein said first contiguous block of luminance data comprises one frame of luminance data.

6. The display controller of claim 5, wherein said at least a second contiguous block of chrominance difference data comprises one frame of chrominance difference data.

7. The display controller of claim 6 wherein said at least one byte lane comprises a plurality of pairs of adjacent byte lanes, each pair of the plurality of pairs of byte lanes for storing pairs of luminance data for one line of one frame of video data.

8. The display controller of claim 7 wherein said at least one byte lane comprises a plurality of pairs of adjacent byte lanes, each pair of the plurality of pairs of byte lanes for storing pairs of chrominance difference data for one line of one frame of video data.

9. The display controller of claim 8, wherein said chrominance difference data is stored in every other line of each of said plurality of pairs of byte lanes and said display controller further comprises a bit block transfer engine, coupled to the bus interface and to the display memory controller, for transferring blocks of data within the display memory, wherein said bit block transfer engine replicates chrominance data from every other line of said plurality of pairs of byte lanes to a corresponding adjacent line within said plurality of pairs of byte lanes.

10. The display controller of claim 9 wherein said bit block transfer engine replicates chrominance data after said display memory controller has completed storing one frame of video data in the display memory.

11. The display controller of claim 10 wherein said display controller outputs a signal through said bus interface to a host processor indicating completion of a bit block transfer operation.

12. A method for assisting decoding of video data partially decoded in a host processor, said method comprising the steps of:
 receiving, in a display controller, video data in a component YUV format and corresponding video data addresses within a predetermined address range, and
 storing the video data in a pixel video format in a display memory.

13. The method of claim 12 wherein the video data comprises luminance and chrominance difference data and the component YUV format comprises a first contiguous block of luminance data and at least a second contiguous block of chrominance difference data.

14. The method of claim 13 wherein the step of storing comprises the step of storing the first contiguous block of luminance data in at least one byte lane within the display memory.

15. The method of claim 14 wherein the step of storing further comprises the step of storing the at least a second contiguous block of chrominance difference data in at least another byte lane within the display memory.

16. The method of claim 15, wherein the first contiguous block of luminance data comprises one frame of luminance data.

17. The method of claim 16, wherein the at least a second contiguous block of chrominance difference data comprises one frame of chrominance difference data.

18. The method of claim 17 wherein the at least one byte lane comprises a plurality of pairs of adjacent byte lanes, each pair of the plurality of pairs of byte lanes for storing pairs of luminance data for one line of one frame of video data.

19. The method of claim 18 wherein the at least one byte lane comprises a plurality of pairs of adjacent byte lanes, each pair of the plurality of pairs of byte lanes for storing pairs of chrominance difference data for one line of one frame of video data.

20. The method of claim 19, wherein the step of storing further comprises the steps of:
 storing chrominance difference data in every other line of each of the plurality of pairs of byte lanes, and
 replicating, in a bit block transfer engine within the display controller, chrominance data from every other line of the plurality of pairs of byte lanes to a corresponding adjacent line within the plurality of pairs of byte lanes.

21. The method of claim 20 wherein the bit block transfer engine replicates chrominance data after the display memory controller has completed storing one frame of video data in the display memory.

22. The method of claim 21 further comprising the step of outputting a signal to a host processor indicating completion of a bit block transfer operation.

23. The display controller of claim 1 wherein the display memory controller is further configured to switch between a first video buffer and a second video buffer in the display memory.

24. The display controller of claim 23 wherein the memory configuration register includes data values indicating locations of the first video buffer and the second video buffer, and wherein the display memory controller utilizes the data values to translate X and Y coordinate of a bit block transfer into memory addresses of the display memory.

25. The display controller of claim 24 wherein the data values in the memory configuration register are programmed from a central processing unit and, alternatively, the data values are programmed from a basic input/output system read-only memory (BIOS ROM).

26. An electronically-readable medium storing a program for permitting a computer to perform a method of assisting decoding of video data partially decoded in a host processor, the method comprising the steps of:

receiving, in a desplay controller, video data in a component YUV format in contiguous successive streams of luminance and chrominance difference data and corresponding video data addresses within a predetermined address range,     setting addresses for a predetermined memory aperture by use of a memory configuration register, and     storing the video data by directing separate luminance and chrominance difference data into predetermined memory portions according to the predetermined memory aperture so as to store said video data in a pixel video format in a display memory.

27. A display system for receiving video data from a data bus in a component YUV format and storing the video data to a display memory in a pixel video format, comprising:

a data bus to supply video data in a component YUV format;

a display memory to store the video data in a pixel video format;

a bus interface, coupled to the data bus, for receiving the video data in a component YUV format and corresponding video data addresses within a predetermined address range;

a display memory controller, coupled to the bus interface, for receiving the video data in a component YUV format in contiguous successive streams of luminance and chrominance difference data and corresponding video data addresses within a predetermined address range and for storing said video data by directing separate luminance and chrominance difference data into predetermined memory portions according to a predetermined memory aperture so as to store the video data in a pixel video format in a display memory, the display memory controller storing Y data in consecutive odd byte locations on succeeding lines in the display memory by performing an address translation on the Y data, the display memory controller further storing U data in every fourth byte location starting with a second byte location and storing V data in every fourth byte location starting with a fourth byte location;

a memory configuration register coupled to the bus interface and the display memory controller and configured to set addresses for the predetermined memory aperture; and     a display to display the video data.

\* \* \* \* \*